United States Patent [19]

Johnson et al.

[11] 3,845,568

[45] Nov. 5, 1974

[54] TAPERED BORE CHECKING GAUGE

[75] Inventors: Robert Allen Johnson; Wesley Paul Raisbeck, both of Ottumwa, Iowa

[73] Assignee: Deere & Company, Moline, Ill.

[22] Filed: Dec. 3, 1973

[21] Appl. No.: 421,344

[52] U.S. Cl............................................. 33/174 E
[51] Int. Cl........ G01b 5/24, G01b 3/46, G01b 3/56
[58] Field of Search ............... 33/174 E, 162, 178 B

[56] References Cited
UNITED STATES PATENTS
2,642,670 6/1953 Dow................................... 33/174 E
FOREIGN PATENTS OR APPLICATIONS
921,358 11/1954 Germany............................ 33/174 E

OTHER PUBLICATIONS

Ham Murro, American Machinist, 09/28/1953, Pg. 150 "Internal, External Tapers Checked with Shop Gages."

*Primary Examiner*—Louis R. Prince
*Assistant Examiner*—Willis Little

[57] ABSTRACT

A taper checking gauge includes an elongated body having a cylindrical central portion, a cylindrical handle at one end, and a frustoconical gauge element at the other end and having substantially the same taper as the bore to be measured, said gauge element being insertable into the bore with the outer surface of the gauge element engaging the bore to establish a set position of the gauge. An annular second gauge element is coaxially mounted on and axially shiftable on the central portion to a limited degree, the second gauge element also having a frustoconical outer surface having substantially the same taper as the bore and engageable therewith. The second gauge element has a radial end surface and a recess intersecting the end surface and the outer surface. When the flat surface around the bore opening intersects the gauge element between the end surface and the end of the recess, the base plane or plane at which the bore diameter is given, is acceptable. The central portion is provided with a pair of recesses on its opposite sides, the inner radial end faces of the recesses being axially offset and adjacent the radial end surface of the second gauge element, and when the end surface of the gauge element intersects the central portion between the ends of the two recesses, the angle of bore taper is acceptable, the location of the second gauge element on the central portion being responsive to the bore taper.

10 Claims, 8 Drawing Figures

PATENTED NOV 5 1974 3,845,568
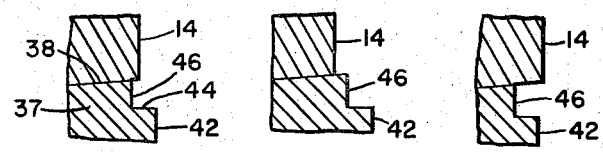
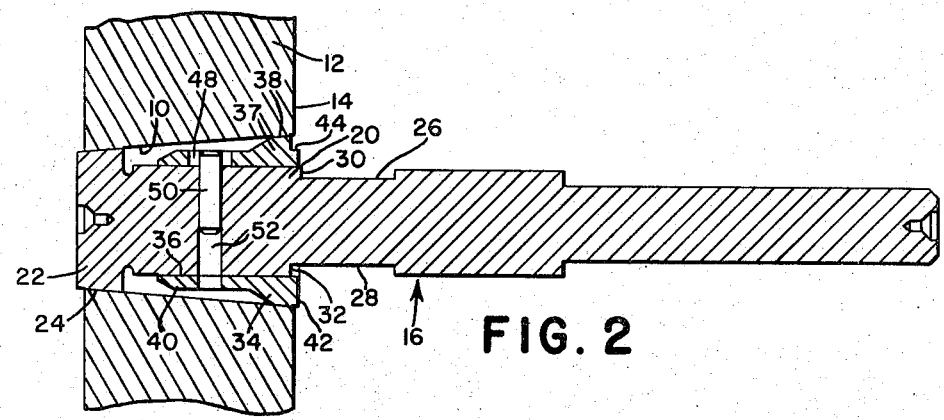
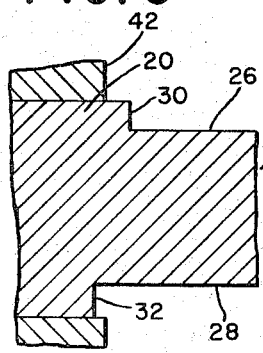
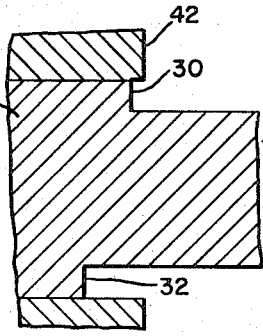
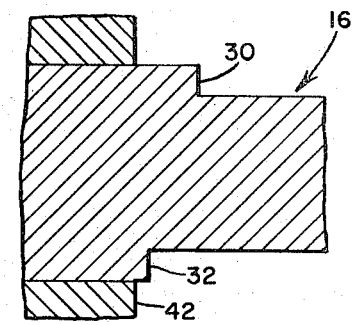
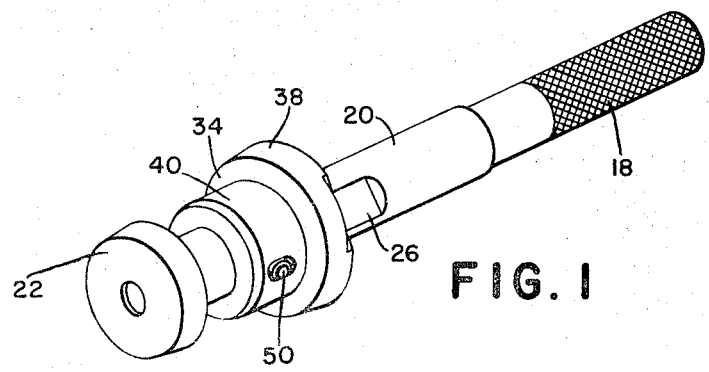

TAPERED BORE CHECKING GAUGE

BACKGROUND OF THE INVENTION

This invention relates to an inspection gauge, and more particularly to an improved gauge for checking the internal taper on a bore.

A tapered bore is usually dimensioned by specifying the diameter of the bore at a base plane, which is a reference plane generally between the surface of the member in which the bore is machined and one thirty-second inch above the surface, and further specifying the taper angle. Frequently, in checking the tapered bores, only the base plane is checked. In other words, a tapered gauge, having the specified diameter at a certain axial position on the gauge, is inserted into the bore, and if the base plane falls within a range of axial positions relative to the nominal position of the base plane, the base plane is acceptable. Often, to also check the angle of taper, a separate gauge has been necessary.

SUMMARY OF THE INVENTION

According to the present invention, there is provided an improved gauge for checking the base plane and the taper of a tapered bore. More specifically, the gauge simultaneously checks the base plane independently of the taper, and checks the taper independently of the base plane.

An important feature of the invention resides in the fact that only a single gauge is required to check both of the above functions, and further, the gauge is simple, durable, and easy to manufacture.

Another feature of the invention resides in the fact that the guage does not require a master for setting the gauge.

BRIEF DESCRIPTION OF THE DRAWINGS

FIG. 1 is a perspective view of a taper checking gauge embodying the invention.

FIG. 2 is an axial section through the gauge, showing the gauge in a tapered bore that is acceptable.

FIG. 3 is an enlarged view of a portion of the gauge and the bore, showing the position of the gauge relative to the bore when the base plane of the bore is acceptable.

FIGS. 4 and 5 are views similar to FIG. 3, but showing the positions of the gauge relative to the bore when the base plane positions are outside the opposite acceptable limits.

FIG. 6 is an enlarged view of a portion of the gauge showing the relative position of the gauge elements when the angle of taper of the bore is acceptable.

FIGS. 7 and 8 are views similar to FIG. 6, but showing the relative positions of the gauge elements when the taper is outside the opposite limits for the taper.

DESCRIPTION OF THE PREFERRED EMBODIMENT

The invention is embodied in a gauge for checking the internal taper in a tapered bore 10 in a workpiece of member 12 having a flat surface 14 normal to the axis of the bore and around the bore opening. The gauge includes an elongated body 16 having a cylindrical handle 18 at one end and a cylindrical central portion 20 coaxial with the handle 18 and having a slightly larger diameter than the handle. The body also includes an integral gauge element 22 at the opposite end of the body from the handle and adjacent to the central portion, the gauge element 22 being frustoconical in shape and coaxial with the central portion 20, the gauge element having a tapered outer surface 24 corresponding to the bore taper.

The central portion has a pair of recesses 26 and 28 on opposite sides of the body, the recesses being formed by machining a flat, chordal surface on opposite sides of the central portion. The recesses 26 and 28 have inner radial end walls 30 and 32 respectively, the end wall 32 being offset slightly from the end wall 30 in an axial direction. As hereinafter described, the end walls function as indicators for the gauge.

The gauge includes a second gauge element 34, that is annular in shape and has an axial bore 36 with substantially the same diameter as the diameter of the central portion 20, the gauge element 34 being axially slidable on the central portion 20. The gauge element 34 has a frustoconical gauge portion 37 adjacent one end, the gauge portion having a tapered outer surface 38 substantially conforming to the taper of the bore 10. The gauge element also includes a smaller diameter portion 40 between the gauge portion 37 and the first gauge element 22. The gauge element 34 also includes a radial end surface 42 in the same general area as the end walls 30 and 32, and the end surface is provided with a recess 44 that intersects the end surface 42. The recess 44 is also made by machining a chordal cut on one side of the gauge portion 37 proximate to the end surface 42, the recess 44 having a radial end wall 46 parallel to and offset from the end surface 42. As hereinafter described, the end surface 42 and the end wall 46 function as additional indicators on the gauge.

The smaller diameter portion 40 of the gauge element 34 has an axially or longitudinally extending slot 48 that extends in a radial direction through one side of the gauge element, and a radial pin 50 is mounted in a bore 52 in the body's central portion 20 and extends radially into the slot 48, the pin preventing relative rotational movement between the body and the second gauge element while permitting a limited amount of axial shifting of the gauge element on the central portion 20.

In operation, the gauge is inserted in the tapered bore 10 that is to be checked, the gauge being inserted axially as far as it will go, at which time the tapered surface 24 on the first gauge element 22 engages the bore to axially position the gauge. If the tapered surface 38 engages the bore before the first gauge seats in the bore, the second gauge 34 shifts axially (to the right in FIG. 2) on the gauge body. Conversely, if the first gauge element seats in the bore before the second gauge element 34 engages the bore, the second gauge element is shiftable along the gauge body to the left until it also seats in the bore. At this point the base plane of the bore can be checked by visually inspecting the location of the surface 14 relative to the axially spaced end wall 46 of the recess 44 and the radial end surface 42 on the second gauge element. If the surface 14 is located between the end wall 46 in the surface 42, as illustrated in FIGS. 2 and 3, the base plane is satisfactory. However, if the surface 42 and the end wall are both outside the flat surface 14, as shown in FIG. 4, the base plane is too far away from the surface, and conversely, if the wall 46 and the surface 42 are both within the bore, interiorly of the surface 14, the base plane is too far to the left.

In the former case, of course, the diameter of the bore at the opening would be too small, and in the latter case, the diameter would be too large.

Simultaneously with the checking of the base plane, the degree of taper can also be checked by determining the relative position of the second gauge element to the first gauge element. Since the central portion 20 is integral with the first gauge element, the relative positions can be checked by determining the position of the gauge element 34 on the central portion 20, and this can be done by observing the position of the second gauge element end surface 42 relative to the end walls 30 and 32 on the central portion recesses 26 and 28. If the taper angle is within the tolerance, the end surface 42 will lie between the end walls 30 and 32, as shown in FIGS. 2 and 6. If the taper angle is too small, the second gauge element will be spaced further from the first gauge element so that the end surface 42 will be disposed outside, or to the right of both the end walls 30 and 32, as shown in FIG. 7. Conversely, if the taper angle is too great, the end surface 42 will be interiorly or to the left of both the indicator surfaces 30 and 32, as shown in FIG. 8.

As is apparent the above described gauge is relatively simple in construction and easy to manufacture. As is also apparent, it is quite simple to check both the base plane and the angle of taper independently of one another, at the same time.

We claim:

1. A gauge for checking the internal taper on a bore whose axis extends at right angles from a flat surface and comprising: an elongated body including a generally cylindrical central portion having a lesser diameter than the diameter of the bore and insertable therein; a first gauge element attached to the body adjacent to said portion and having contact surfaces lying in a circular array and forming an outer surface engageable with the bore to hold the body in a set axial position relative to the bore; an annular second gauge element coaxially mounted on said central portion and axially shiftable thereon to a limited degree, said second gauge element having contact surfaces lying in a circular array and forming an outer surface engageable with the bore adjacent said flat surface when the body is in said set position by axially shifting the second gauge element on the central portion, said second gauge element including first and second axially spaced indicator means on the outer surface adjacent to said flat surface, the location of the flat surface between said first and second indicator means when the second gauge element engages the bore indicating an acceptable bore base plane position, said second gauge element having a radial end surface and the central portion having third and fourth axially spaced indicator means adjacent said end surface, said end surface being disposed between said third and fourth indicator means when the second gauge element is within acceptable axial positions relative to the central portion, the said axial position of the second gauge element relative to the central portion being responsive to the angle of bore taper.

2. The invention defined in claim 1 wherein the central portion is cylindrical and the third and fourth indicator means are formed by circumferentially and axially spaced walls of a pair of recesses on the peripheral surface of the central portion.

3. The invention defined in claim 2 wherein the recesses are formed by flat chordal areas on the central portion.

4. The invention defined in claim 1 wherein the first gauge element is frustoconical in shape and coaxially attached to the central portion, the taper of the gauge element substantially corresponding to the taper of the bore.

5. The invention defined in claim 4 wherein the outer surface of the second gauge element is frustoconical in shape, the taper of said surface substantially corresponding to the taper of the bore.

6. The invention defined in claim 4 wherein the radial end surface of the second gauge element forms the second indicator means, and the first indicator means is formed by a recess intersecting said end surface and extending partially around the outer surface of the gauge element.

7. The invention defined in claim 6 wherein the central portion is cylindrical and the third and fourth indicator means are formed by circumferentially and axially spaced end walls of a pair of recesses on the peripheral surface of the central portion.

8. The invention defined in claim 7 wherein the second gauge element includes a slot extending longitudinally parallel to the axis of the second gauge element and radially through one side of the gauge element, and including a radial pin mounted on the central portion and extending into the slot to permit said limited axial shifting of the second gauge element.

9. The invention defined in claim 1 wherein the radial end surface of the second gauge element forms the second indicator means, and the first indicator means is formed by a recess intersecting said end surface and extending partially around the outer surface of the gauge element.

10. The invention defined in claim 9 and including handle means extending from the opposite end of the central portion from the first gauge element.

* * * * *